United States Patent
Lewis et al.

(10) Patent No.: US 9,493,243 B2
(45) Date of Patent: Nov. 15, 2016

(54) AMBIENT CONDITION BASED ADJUSTING OF CABIN PRESSURE TO ACHIEVE TARGET AIRCRAFT INFLOW

(71) Applicant: HAMILTON SUNDSTRAND CORPORATION, Windsor Locks, CT (US)

(72) Inventors: Brendon W. Lewis, Simsbury, CT (US); Young K. Park, Simsbury, CT (US); Allison Mainelli, Rockfall, CT (US); Cuiye Chen, Greer, SC (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 771 days.

(21) Appl. No.: 13/871,540

(22) Filed: Apr. 26, 2013

(65) Prior Publication Data
US 2014/0323026 A1 Oct. 30, 2014

(51) Int. Cl.
B64D 13/04 (2006.01)

(52) U.S. Cl.
CPC .................... B64D 13/04 (2013.01)

(58) Field of Classification Search
CPC ...................................... B64D 13/04
USPC ........................ 454/70, 71, 74, 76
See application file for complete search history.

(56) References Cited

U.S. PATENT DOCUMENTS

| | | | |
|---|---|---|---|
| 2,549,673 A | 4/1951 | Del Mar | |
| 3,049,925 A | 8/1962 | Sontag | |
| 4,553,474 A | 11/1985 | Wong et al. | |
| 5,186,681 A | 2/1993 | Emmons | |
| 5,934,083 A * | 8/1999 | Scherer | B64D 13/08 62/172 |
| 7,383,105 B2 * | 6/2008 | Conroy, Jr. | B64D 13/00 244/118.5 |
| 7,778,735 B2 * | 8/2010 | Gray | B64D 13/04 244/118.5 |
| 7,837,541 B2 * | 11/2010 | Gray | B64D 13/04 244/118.5 |
| 7,871,038 B2 * | 1/2011 | Space | B64D 13/06 244/118.5 |
| 7,950,987 B2 | 5/2011 | McCoy et al. | |
| 2011/0126562 A1 | 6/2011 | Dittmar et al. | |

(Continued)

FOREIGN PATENT DOCUMENTS

| | | |
|---|---|---|
| FR | 885111 A | 9/1943 |
| GB | 628456 A | 8/1949 |

OTHER PUBLICATIONS

European Search Report for Application No. EP 14166080. Mailed on Oct. 7, 2014, 5 pages.

*Primary Examiner* — Gregory Huson
*Assistant Examiner* — Dana Tighe
(74) *Attorney, Agent, or Firm* — Cantor Colburn LLP

(57) ABSTRACT

Embodiments relate to adjusting cabin pressure based on ambient conditions to achieve a target aircraft inflow. An aspect includes receiving a number of occupants on an aircraft. The ambient conditions on the aircraft are monitored and an occupant threshold limit is determined for the aircraft based on the ambient conditions. If it is determined that the number of occupants exceeds the occupant threshold limit, the cabin pressure is reduced in the aircraft according to embodiments. The cabin pressure in the aircraft is reset in response to the occupant threshold limit being increased due to changing ambient conditions.

12 Claims, 3 Drawing Sheets

(56) References Cited

U.S. PATENT DOCUMENTS

2014/0162542 A1\* 6/2014 Huart .................... B64D 13/02
454/74

\* cited by examiner

AMBIENT CONDITION BASED ADJUSTING OF CABIN PRESSURE TO ACHIEVE TARGET AIRCRAFT INFLOW

BACKGROUND OF THE INVENTION

The subject matter disclosed herein relates to air conditioning and pressurizing systems for an aircraft, and more specifically, to adjusting cabin pressure based on ambient conditions to achieve a target aircraft inflow.

Fresh air flow and temperature control within an aircraft is controlled by an air conditioning pack. The fresh air flow is provided as hot compressed air by a flow source. The air conditioning pack performs cooling of the air to regulate the temperature in the flight deck and cabin. The required inflow is typically based on the number of occupants within the aircraft. The amount of flow that can be produced by a flow source is dependent on ambient conditions such as ambient pressure, aircraft speed, and ambient temperature. For a flow source that is operating at its capacity, a contemporary method for increasing fresh flow is to reduce the backpressure of the air condition pack downstream of the flow source. The reduction of backpressure is typically achieved by opening bypass valves within the air conditioning pack. However, while the use of bypass valves will result in increased inflow, it can also result in increased cabin temperatures because the hot compressed air from the flow source is bypassing the cooling capability of the air condition pack.

BRIEF DESCRIPTION OF THE INVENTION

According to an embodiment of the present invention, a method for adjusting cabin pressure based on ambient conditions to achieve a target aircraft inflow is provided. The method includes receiving a number of occupants on an aircraft. The ambient conditions on the aircraft are monitored by a processing device. An occupant threshold limit is determined for the aircraft based on the ambient conditions. If it is determined that the number of occupants exceeds the occupant threshold limit, the cabin pressure is reduced in the aircraft according to embodiments. The cabin pressure in the aircraft is reset in response to the occupant threshold limit being increased due to changing ambient conditions.

According to another embodiment of the present invention, a system for adjusting cabin pressure based on ambient conditions to achieve a target aircraft inflow is provided. The system includes a computer processor and logic executable by the computer processor. The logic is configured to implement a method. The method includes receiving a number of occupants on an aircraft. The ambient conditions on the aircraft are monitored and an occupant threshold limit is determined for the aircraft based on the ambient conditions. If it is determined that the number of occupants exceeds the occupant threshold limit, the cabin pressure is reduced in the aircraft according to embodiments. The cabin pressure in the aircraft is reset in response to the occupant threshold limit being increased due to changing ambient conditions.

According to a further embodiment of the present invention, a computer program product for adjusting cabin pressure based on ambient conditions to achieve a target aircraft inflow is provided. The computer program product includes a storage medium having computer-readable program code embodied thereon, which when executed by a computer processor, causes the computer processor to implement a method. The method includes receiving a number of occupants on an aircraft. The ambient conditions on the aircraft are monitored and an occupant threshold limit is determined for the aircraft based on the ambient conditions. If it is determined that the number of occupants exceeds the occupant threshold limit, the cabin pressure is reduced in the aircraft according to embodiments. The cabin pressure in the aircraft is reset in response to the occupant threshold limit being increased due to changing ambient conditions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments disclosed herein provide a computer-implemented method, computer system, and computer program product for adjusting cabin pressure based on ambient conditions to achieve a target aircraft inflow. An aspect of embodiments includes receiving a number of occupants on an aircraft. The ambient conditions on the aircraft are monitored and an occupant threshold limit is determined for the aircraft based on the ambient conditions. If it is determined that the number of occupants exceeds the occupant threshold limit, the cabin pressure is reduced in the aircraft according to embodiments. The cabin pressure in the aircraft is reset in response to the occupant threshold limit being increased due to changing ambient conditions.

Embodiments disclosed herein reduce the backpressure of a flow source by reducing the cabin pressure within the aircraft. The cabin pressure and cabin temperature both impact passenger comfort. There may be situations where the cabin temperature would have to be very high in order to achieve the required inflow using pack bypass valves of a temperature control system. Under these conditions, embodiments decrease cabin pressure to allow for more comfortable cabin temperatures. A number of occupants that may be supported by the flow source may be determined as a function of the capacity of the flow source, maximum desired cabin temperature, and ambient conditions such as temperature, altitude, and aircraft speed. If the number of occupants exceeds the number of occupants that may be supported, a reduction in cabin pressure is triggered in order to generate the required fresh flow to maintain comfortable cabin temperatures according to disclosed embodiments.

When ambient conditions change such that the occupant limit greater than the number of passengers, the preferred cabin pressure may be restored according to disclosed embodiments.

Figure 1:
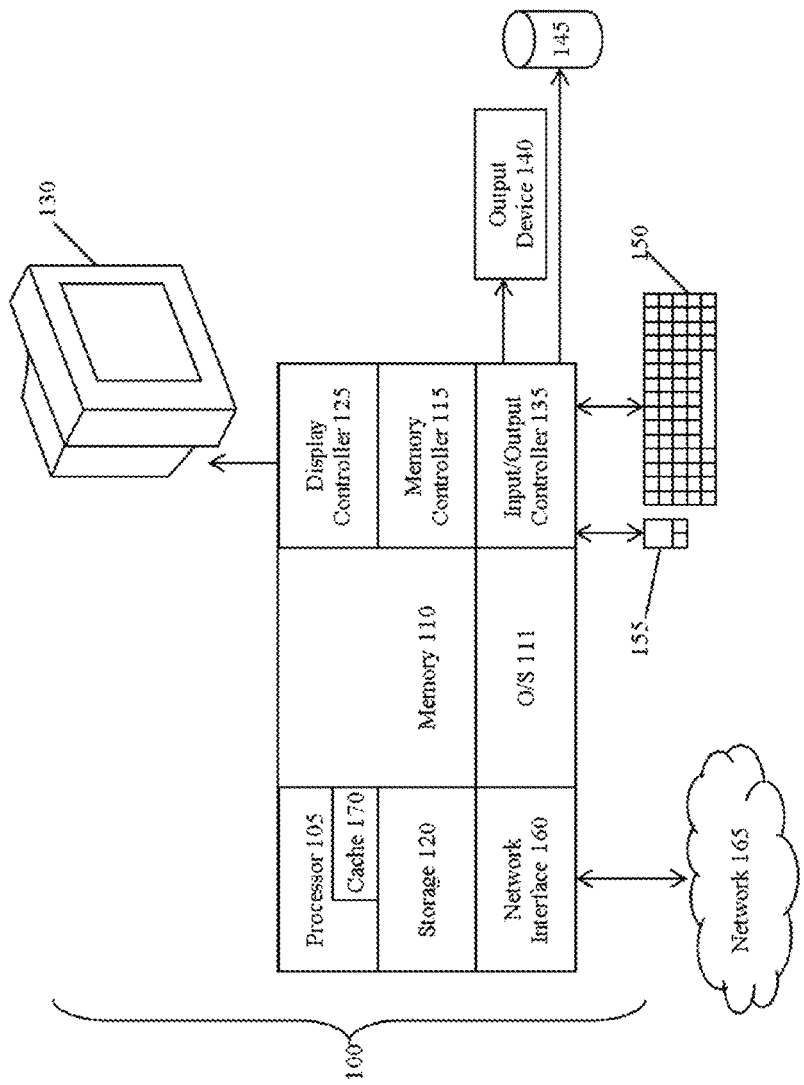
FIG. 1 is a block diagram illustrating a computing device for adjusting cabin pressure based on ambient conditions to achieve a target aircraft inflow according to an embodiment.

FIG. 1 illustrates a block diagram of a computing device 100 for adjusting cabin pressure based on ambient conditions to achieve a target aircraft inflow according to an embodiment. The methods described in this disclosure may be implemented in hardware, software (e.g., firmware), or a combination thereof In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The system 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
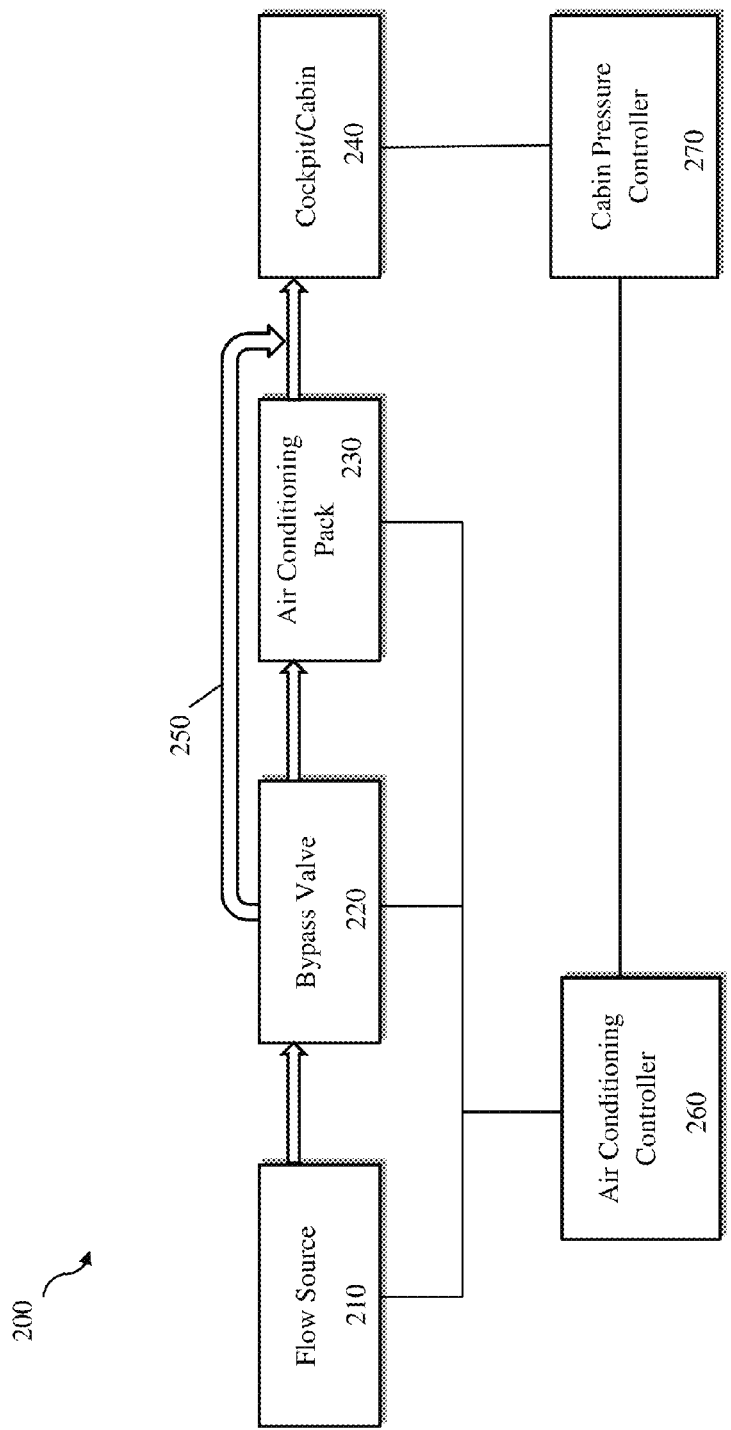
FIG. 2 is a block diagram illustrating a temperature control system for an aircraft according to an embodiment.

With reference to FIG. 2, a block diagram for a temperature control system 200 for an aircraft according to an embodiment is illustrated. The temperature control system 200 of an embodiment may include a flow source 210, a bypass valve 220, an air conditioning pack 230, a cockpit/cabin 240, a bypass line 250, an air conditioning controller 260, and a cabin pressure controller 270.

In the temperature control system 200 of an embodiment, high temperature compressed air is typically provided by a flow source 210. The air from the flow source 210 is fed to the bypass valve 220 of an embodiment, which then directs the flow of the compressed air to the remainder of the temperature control system 200. According to an embodiment, the temperature control system 200 includes an air conditioning pack 230 for cooling the compressed air before passing it to the cockpit/cabin 240 of the aircraft. Although illustrated as separate components in FIG. 2, the bypass valve 220 may be part of the air conditioning pack according to an embodiment. The temperature control system 200 also includes a bypass line 250 that feeds the high temperature compressed air from the flow source 210 around the air conditioning pack 230. Accordingly, the compressed air fed from the bypass line 250 may combine with the cooled air outputted from the air conditioning pack 230 prior to being fed to the cockpit/cabin 240 of the aircraft.

The air conditioning controller 260 of an embodiment may be in communication with the flow source 210, the bypass valve 220, the air conditioning pack 230, and the cabin pressure controller 270. According to an embodiment, the air conditioning controller 260 may monitor the temperature of the cockpit/cabin 240, modulate the flow source 210, the bypass valve 220, and air conditioning pack 230, and transmit commands to the cabin pressure controller 270 to increase or decrease the cockpit/cabin pressure. The cabin pressure controller 270 of an embodiment is in communication with the cockpit/cabin 240 and may operate outflow valves that control the cockpit/cabin pressure in the aircraft.

Figure 3:
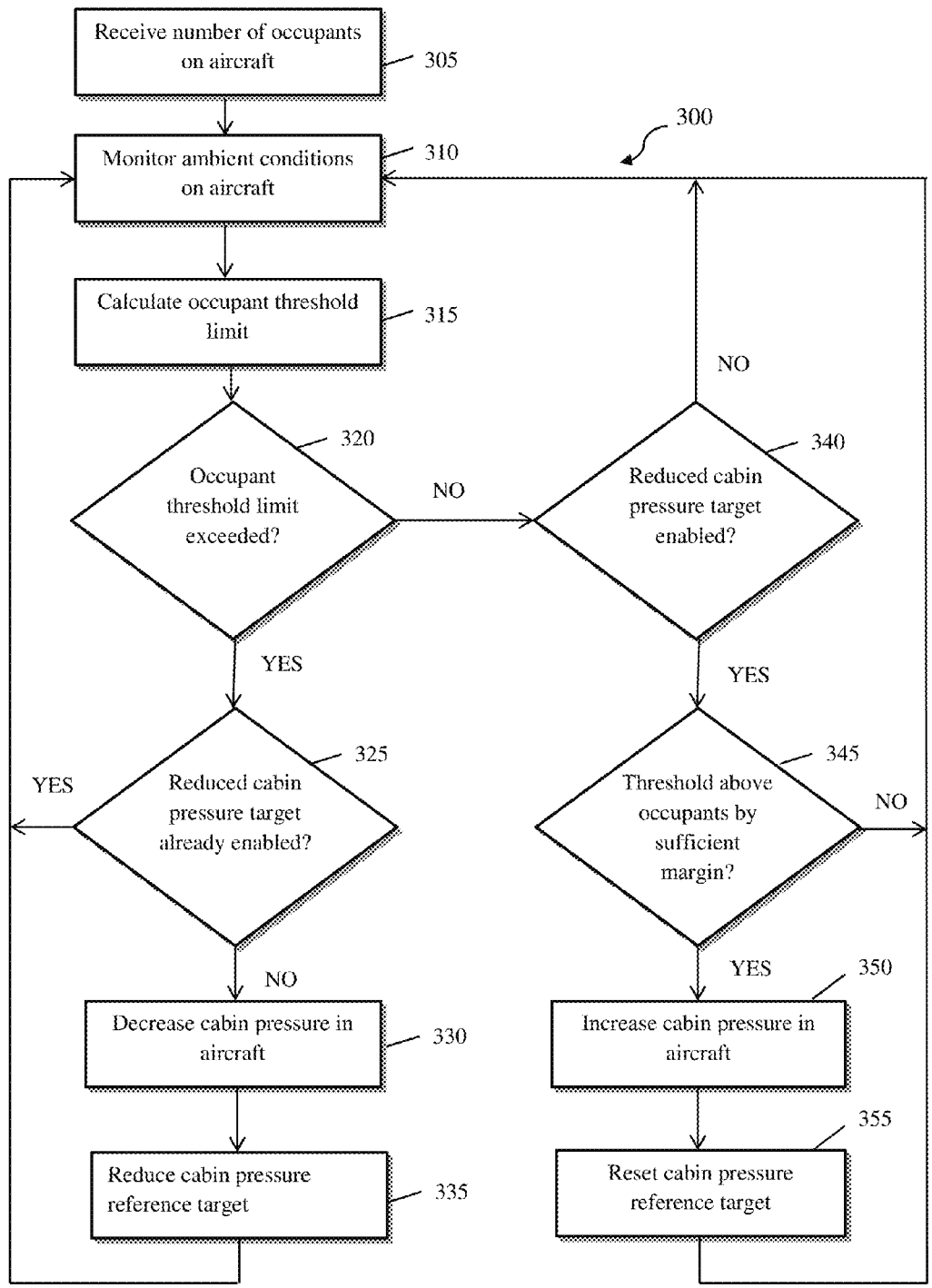
FIG. 3 is a flow diagram illustrating a process for preemptively adjusting cabin pressure based on ambient conditions to achieve a target aircraft inflow according to an embodiment.

With reference to FIG. 3, a process 300 performed by an embodiment of a processor 105 of computer 100 is generally shown. As shown in FIG. 3, the process 300 preemptively adjusts cabin pressure based on ambient conditions to achieve a target aircraft inflow.

At block 305, an inputted number of occupants or passengers on an aircraft may be received by an air conditioner controller 260 according to an embodiment. For example, a flight attendant may input the number of occupants on the aircraft via a numerical keypad device or a graphical user interface (GUI). If there is no user input is received regarding the number of occupants, the number of occupants is set to a maximum capacity of the aircraft as a default according to an embodiment.

At block 310, the ambient conditions on the aircraft are monitored according to an embodiment. The ambient conditions may include, but are not limited to, temperature, altitude, and aircraft speed. An occupant threshold limit is then calculated based on the ambient conditions, as shown in block 315. The occupant threshold limit includes a number of occupants that can be supported by the flow source 210 without exceeding a maximum cabin temperature. The occupant threshold limit represents the flow source capacity and is derived as a function of ambient temperature, altitude, and aircraft speed.

The process 300 then determines whether the occupant threshold limit for the aircraft is exceeded, as shown in block 320. According to an embodiment, the number of occupants on the aircraft may be compared to the occupant threshold limit. Responsive to the number of occupants exceeding the occupant threshold limit at block 320, an embodiment determines whether a reduced cabin pressure target has already been enabled, as shown in block 325. If a reduced cabin pressure target has not been enabled at block 325, the air conditioning controller 260 may transmit a command to the cabin pressure controller 270 to reduce cabin pressure in the aircraft, and decrease the backpressure downstream from the flow source 210, as shown in block 330. At block 335, a cabin pressure reference target may be reduced and the outflow valves of a cabin pressure system may be controlled by the cabin pressure controller 270 to maintain the new cabin pressure reference target. According to an embodiment, the ambient conditions are then reassessed at block 310 for any changes to the ambient conditions, such as a cooler ambient temperature or a lower altitude, which may affect the occupant threshold limit. Additionally, if a reduced cabin pressure target has already been enabled at block 325, the ambient conditions are then reassessed at block 310 for any changes to the ambient conditions, such as a cooler ambient temperature or a lower altitude, which may affect the occupant threshold limit.

Responsive to the number of occupants being below the occupant threshold limit determined at block 320, an embodiment determines whether a reduced cabin pressure target has been enabled at block 340. Responsive to the reduced cabin pressure target not being enabled at block 340, the ambient conditions are then reassessed at block 310 for any changes to the ambient conditions, such as a cooler ambient temperature or a lower altitude, which may affect the occupant threshold limit. Responsive to the reduced cabin pressure target being enabled at block 340, an embodiment further determines whether the occupant threshold limit is above the number of occupants by a sufficient margin, as shown in block 345. According to an embodiment, the margin is calculated based on expected variations in ambient temperature, altitude, and aircraft speed during a typical flight due to sensor tolerances and typical aircraft operation. The margin is required to prevent the cabin pressure reference from being repeatedly changed due to small variations in ambient condition measurements.

If the occupant threshold limit is not above the number of occupants by the sufficient margin at block 345, then the ambient conditions are reassessed at block 310 for any changes to the ambient conditions, such as a cooler ambient temperature or a lower altitude, which may affect the occupant threshold limit. However, if the occupant threshold limit is above the number of occupants by the sufficient margin at block 345, an embodiment increases the cabin pressure in the aircraft, as shown in block 350, and resets the cabin pressure target accordingly, as shown in block 355. The ambient conditions are then reassessed at block 310 for any changes to the ambient conditions according to an embodiment.

Technical effects and benefits of the embodiments disclosed herein include maximizing the flow capacity of a flow source 210 by reducing the cabin pressure of an aircraft to avoid having to open a bypass valve 220 to reduce backpressure, which would result in warmer cabin temperatures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method, comprising:
receiving a number of occupants on an aircraft at a processing device;
monitoring, by the processing device, ambient conditions on the aircraft;
determining with the processing device an occupant threshold limit for the aircraft based on the ambient conditions;
signaling a cabin pressure controller to reduce cabin pressure in the aircraft when the number of occupants exceeds the occupant threshold limit; and
resetting the cabin pressure in the aircraft in response to the occupant threshold limit increasing due to changing ambient conditions;
wherein the occupant threshold limit is a number of occupants that can be supported by a flow source without exceeding a maximum cabin temperature, the occupant threshold limit a function of ambient temperature, altitude and aircraft speed.

2. The method of claim 1, wherein the reducing of the cabin pressure further comprises:
modifying a cabin pressure reference target; and
controlling outflow valves of a cabin pressure system to maintain the new cabin pressure reference target.

3. The method of claim 1, wherein the number of occupants on the aircraft is received as user input from a selected one of a numerical keypad and a graphical user interface.

4. The method of claim 3, wherein the number of occupants on the aircraft defaults to a maximum capacity of the aircraft responsive to receiving no user input.

5. A computer system, comprising:
a memory having computer readable computer instructions and a processor for executing the computer readable instructions to perform a method comprising:
receiving a number of occupants on an aircraft;
monitoring ambient conditions on the aircraft;
determining an occupant threshold limit for the aircraft based on the ambient conditions;
reducing cabin pressure in the aircraft responsive to the number of occupants exceeding the occupant threshold limit; and
resetting the cabin pressure in the aircraft in response to the occupant threshold limit increasing due to changing ambient conditions:
wherein the occupant threshold limit is a number of occupants that can be supported by a flow source without exceeding a maximum cabin temperature, the occupant threshold limit a function of ambient temperature, altitude, and aircraft speed.

6. The computer system of claim 5, wherein the reducing of the cabin pressure further comprises:
modifying a cabin pressure reference target; and
controlling outflow valves of a cabin pressure system to maintain the new cabin pressure reference target.

7. The computer system of claim 5, wherein the number of occupants on the aircraft is received as user input from a selected one of a numerical keypad and a graphical user interface.

8. The computer system of claim 5, wherein the number of occupants on the aircraft defaults to a maximum capacity of the aircraft responsive to receiving no user input.

9. A computer program product, comprising:
a computer readable storage medium having program code embodied therewith, the program code executable by processor to:
receive a number of occupants on an aircraft;
monitor ambient conditions on the aircraft;
determine an occupant threshold limit for the aircraft based on the ambient conditions;
reduce cabin pressure in the aircraft responsive to the number of occupants exceeding the occupant threshold limit; and
reset the cabin pressure in the aircraft in response to the occupant threshold limit increasing due to changing ambient conditions:
wherein the occupant threshold limit is a number of occupants that can be supported by a flow source without exceeding a maximum cabin temperature, the occupant threshold limit a function of ambient temperature, altitude, and aircraft speed.

10. The computer program product of claim 9, wherein the reducing of the cabin pressure further comprises:
modifying a cabin pressure reference target; and
controlling outflow valves of a cabin pressure system to maintain the new cabin pressure reference target.

11. The computer program product of claim 9, wherein the number of occupants on the aircraft is received as user input from a selected one of a numerical keypad and a graphical user interface.

12. The computer program product of claim 9, wherein the number of occupants on the aircraft defaults to a maximum capacity of the aircraft responsive to receiving no user input.

* * * * *